United States Patent
Kim

(10) Patent No.: US 10,605,305 B2
(45) Date of Patent: Mar. 31, 2020

(54) VIBRATION REDUCTION APPARATUS FOR BEARING AND BEARING HAVING THE SAME

(71) Applicant: KOREA AEROSPACE RESEARCH INSTITUTE, Daejeon (KR)

(72) Inventor: Dae Kwan Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/130,474

(22) Filed: Sep. 13, 2018

(65) Prior Publication Data

US 2019/0128322 A1 May 2, 2019

(30) Foreign Application Priority Data

Oct. 30, 2017 (KR) .................. 10-2017-0142622

(51) Int. Cl.
| | |
|---|---|
| *F16C 27/06* | (2006.01) |
| *F16F 15/124* | (2006.01) |
| *F16F 1/373* | (2006.01) |
| *F16F 15/12* | (2006.01) |

(52) U.S. Cl.
CPC .......... *F16C 27/066* (2013.01); *F16F 15/124* (2013.01); *F16F 1/373* (2013.01); *F16F 15/1201* (2013.01)

(58) Field of Classification Search
CPC ......... F16C 27/06; F16C 27/066; F16F 1/373; F16F 15/124; F16F 15/1201

USPC .................. 384/535, 536, 581, 582
See application file for complete search history.

(56) References Cited

U.S. PATENT DOCUMENTS

| | | | |
|---|---|---|---|
| 7,683,608 B2 * | 3/2010 | Kiermeier | G01M 7/04 324/756.01 |
| 9,689,425 B2 * | 6/2017 | Daimer | F04D 29/668 |
| 2015/0233293 A1 * | 8/2015 | Grogg | F02C 7/06 248/562 |

FOREIGN PATENT DOCUMENTS

| | | |
|---|---|---|
| JP | 10-159905 A | 6/1998 |
| JP | 2015-190331 A | 11/2015 |
| KR | 10-0951961 B1 | 4/2010 |
| KR | 10-1384135 B1 | 4/2014 |
| KR | 10-1384140 B1 | 4/2014 |

* cited by examiner

*Primary Examiner* — James Pilkington
(74) *Attorney, Agent, or Firm* — Rabin & Berdo, P.C.

(57) ABSTRACT

Provided is a vibration reduction device for a bearing, including: a bearing tube (50) which is spaced apart from an outer race of a bearing at a predetermined interval and surrounds the outer race; and a link (100) which is disposed between the outer race and the bearing tube, in which the link includes an outer race connecting portion (120) which is in contact with the outer race, and a tube connecting portion (130) which is in contact with the bearing tube, such that vibration reduction performance is implemented by the bearing tube and the link installed at an outer side of the bearing, and as a result, the vibration reduction device may be applied to various fields in which it is necessary to minimize vibration.

10 Claims, 9 Drawing Sheets

RELATED ART

Side view (-Y)

Top view (-Z)

Side view (-Y)

VIBRATION REDUCTION APPARATUS FOR BEARING AND BEARING HAVING THE SAME

CROSS-REFERENCE TO RELATED APPLICATIONS

This application claims the priority of Korean Patent Application No. 10-2017-0142622 filed on Oct. 30, 2017, in the Korean Intellectual Property Office, the disclosure of which is incorporated herein by reference.

BACKGROUND

Field

The present disclosure relates to a technology of reducing vibration of a bearing provided on a rotating shaft for transmitting rotational motion, and particularly, to a technology capable of reducing vibration, which is generated by a rotation, by adding a structure, which serves to reduce vibration, at an outer side of an outer race of a bearing.

Description of the Related Art

A bearing is one of the mechanical elements which restrict relative motion with respect to desired motion and reduce friction between moving parts. The bearing is a component which is in contact with a rotating or reciprocally moving counterpart component and supports a shaft or the like while receiving a load. The bearing transmits rotational torque to two or more shafts and serves to adjust a rotational speed and a torque transmission ratio through a gear ratio.

There are problems in that a bearing in the related art does not have a function of reducing vibration of a vibration source which is transmitted from a rotating shaft, and additional vibration is generated due to the characteristics of the bearing. To solve the problems, there are technologies in the related art in which isolation systems are additionally mounted outside rotating devices and vibration sources to reduce vibration of the vibration sources, as illustrated in FIG. 1 (Relevant Patent Documents: Korean Patent Nos. 10-1384135 and 10-1384140).

However, in the technologies in the related art, a vibration reduction device needs to be separately and additionally mounted, an additional weight is increased, and an additional space is required, such that there is a problem in that the system is complicated.

SUMMARY

An object of a technology of the present disclosure is to provide a technology in which a structural device having a function of reducing vibration is added to a bearing essentially used for a rotating structure, thereby implementing both a basic purpose of the bearing itself and a function of reducing vibration.

The present disclosure provides a vibration reduction device for a bearing, including: a bearing tube 50 which is spaced apart from an outer race of a bearing at a predetermined interval and surrounds the outer race; and a link which 100 is disposed between the outer race and the bearing tube, in which the link includes an outer race connecting portion 120 which is in contact with the outer race, and a tube connecting portion 130 which is in contact with the bearing tube.

The outer race connecting portion 120 is disposed on the bearing in a radial direction, and has one end fixed to the outer race, and the other end spaced apart from the bearing tube at a predetermined interval, and a first stopper 122 made of an elastic material is provided at the other end of the outer race connecting portion.

The tube connecting portion 130 is disposed on the bearing in the radial direction, and has one end fixed to the bearing tube, and the other end spaced apart from the outer race at a predetermined interval, and a second stopper 132 made of an elastic material is provided at the other end of the tube connecting portion.

The vibration reduction device further includes a connecting member 110 which is disposed in a circumferential direction between the outer race and the bearing tube and connects the outer race connecting portion and the tube connecting portion, the connecting member has cross section reducing portions formed by reducing cross sections so that the connecting member is elastically deformable, and the cross section reducing portions include: a first cross section reducing portion 113 which is formed by reducing a width of the connecting member 110 in a direction of a rotation axis of the bearing; and a second cross section reducing portion 115 which is formed by reducing a width of the connecting member 110 in a direction perpendicular to the rotation axis of the bearing.

According to the configuration of the present disclosure, the vibration reduction performance is implemented by the tube and the link installed outside the bearing, and both of the basic purpose of the bearing itself and the function of reducing vibration are exhibited, such that the present disclosure may be applied to various fields in which it is necessary to reduce vibration generated in the system in which rotational motion is performed.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Figure 1:
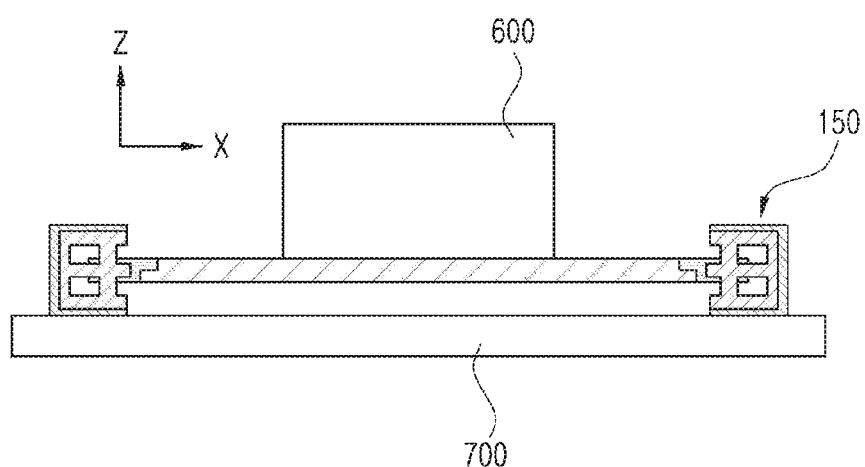
FIG. 1 is a view illustrating a technology of reducing vibration of a bearing in the related art.
Figure 2:
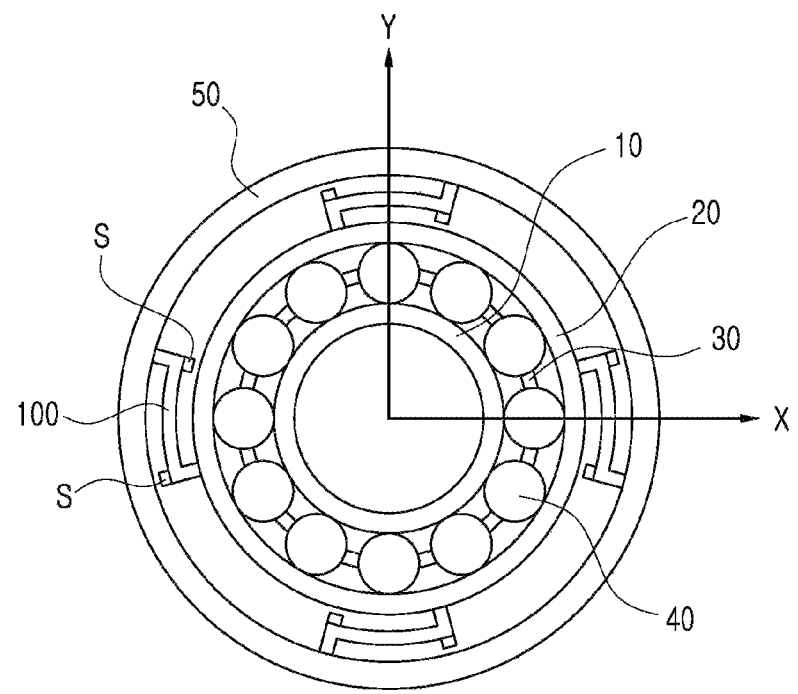
FIG. 2 is a view illustrating a cross section of a vibration reduction bearing according to an exemplary embodiment of the present disclosure.
Figure 3:
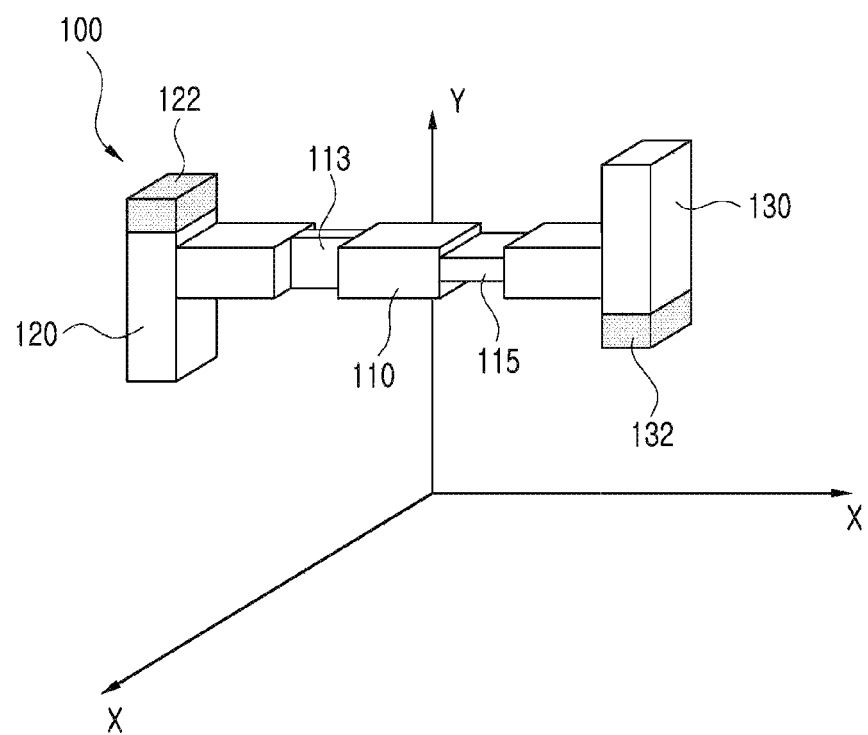
FIG. 3 is a perspective view of a link of the vibration reduction bearing according to the exemplary embodiment of the present disclosure.
Figure 4:
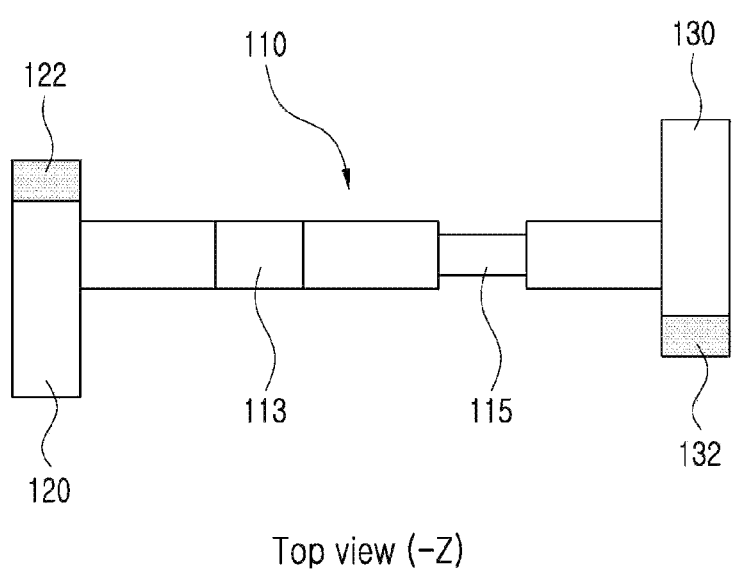
FIG. 4 is a view illustrating the link illustrated in FIG. 3 when viewed along a Z axis.
Figure 5:
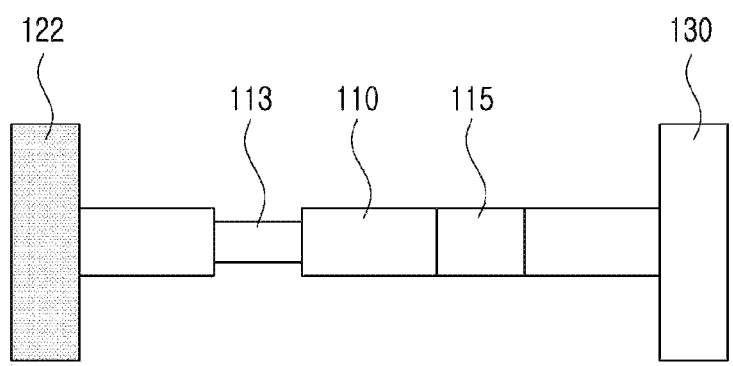
FIG. 5 is a view illustrating the link illustrated in FIG. 3 when viewed along a Y axis.

FIG. 2 is a view illustrating a cross section of a vibration reduction bearing according to an exemplary embodiment of the present disclosure, FIG. 3 is a perspective view of a link of the vibration reduction bearing according to the exemplary embodiment of the present disclosure, FIG. 4 is a view illustrating the link illustrated in FIG. 3 when viewed along a Z-axis, and FIG. 5 is a view illustrating the link illustrated in FIG. 3 when viewed along a Y-axis.

A vibration reduction device for a bearing according to the present disclosure may be applied to a ball bearing or a sliding bearing, but the vibration reduction device for a bearing according to the present disclosure is particularly applied to the ball bearing. Referring to FIG. 2, in a bearing, balls 40 are disposed between an inner race 10 and an outer race 20 by a cage 30. Further, a vibration reduction device according to the present disclosure is provided at an outer side of the outer race of the bearing having a general shape and includes a bearing tube 50 which surrounds the outer race of the bearing and is spaced apart from the outer race at a predetermined interval. Further, links 100, which are features of the present disclosure, are disposed between the outer race and the bearing tube and support the bearing tube and the outer race.

The link 100 includes a connecting member 110 which is disposed in a circumferential direction between the outer race and the bearing tube, an outer race connecting portion 120 which is provided at one end of the connecting member and is in contact with the outer race, and a tube connecting portion 130 which is provided at the other end of the connecting member and is in contact with the bearing tube. The outer race connecting portion 120 and the tube connecting portion 130 are disposed in a radial direction of the bearing and support the outer race and the bearing tube.

Specifically, the outer race connecting portion 120 is disposed on the bearing in the radial direction, one end of the outer race connecting portion 120 is fixed to the outer race, and the other end of the outer race connecting portion 120 is spaced apart from the bearing tube at a predetermined interval. Further, a first stopper 122 made of an elastic material is provided at the other end of the outer race connecting portion which is provided to be spaced apart from the bearing tube, thereby preparing for a collision with the bearing tube.

Further, the tube connecting portion 130 is disposed on the bearing in the radial direction, one end of the tube connecting portion 130 is fixed to the bearing tube, the other end of the tube connecting portion 130 is spaced apart from the outer race at a predetermined interval, and a second stopper 132 made of an elastic material is provided at the other end of the tube connecting portion which is spaced apart from the outer race, thereby preparing for a collision with the outer race. The reference letter "S" in FIG. 2 represents the first stopper 122 and the second stopper 132 in FIGS. 3-5.

In addition, each of the connecting member 110, the outer race connecting portion 120, and the tube connecting portion 130 of the vibration reduction device of the present disclosure may have a quadrangular cross section. For ease of description, directions are defined. In the perspective view of the link illustrated in FIG. 3, a forward direction (direction of a rotation axis of the bearing) is defined as a Z axis, a direction, which is parallel to a longitudinal direction of the connecting member 110 between the two directions perpendicular to the rotation axis of the bearing, is defined as an X axis, and the remaining direction is defined as a Y axis.

FIG. 4 illustrates the link when viewed along the Z axis, and FIG. 5 illustrates the link when viewed along the Y axis. Referring to FIGS. 4 and 5, the connecting member has cross section reducing portions with reduced cross sections so that the connecting member is elastically deformable, and the cross section reducing portions include a first cross section reducing portion 113 which is formed by reducing a width of the connecting member 110 in the direction (X-axis direction) of the rotation axis of the bearing, and a second cross section reducing portion 115 which is formed by reducing a width of the connecting member 110 in the direction (Y-axis direction) perpendicular to the rotation axis of the bearing.

Figure 6:
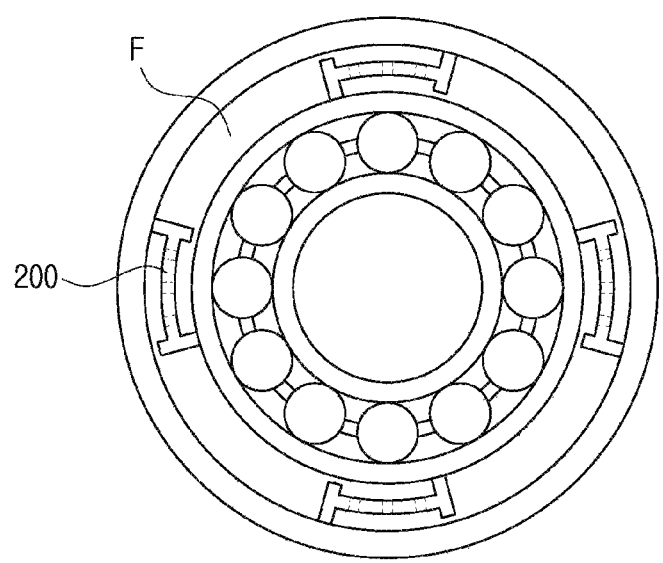
FIG. 6 is a view illustrating a cross section of a vibration reduction bearing according to another exemplary embodiment of the present disclosure.
Figure 7:
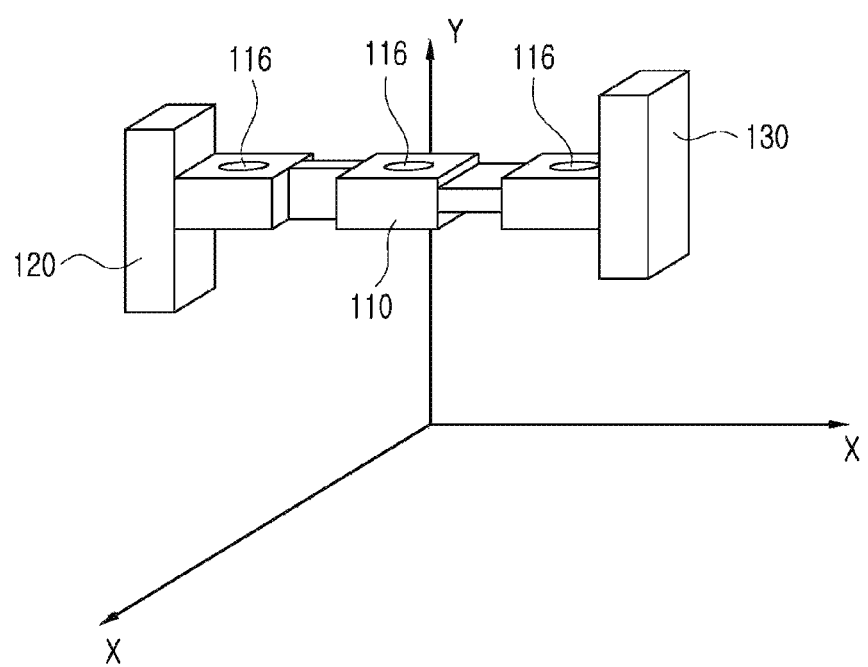
FIG. 7 is a perspective view of a link of the vibration reduction bearing illustrated in FIG. 6.
Figure 8:
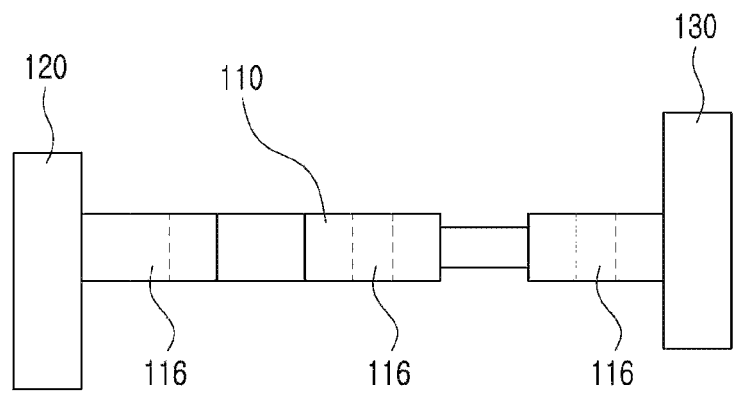
FIG. 8 is a view illustrating the link illustrated in FIG. 7 when viewed along the Z axis.
Figure 9:
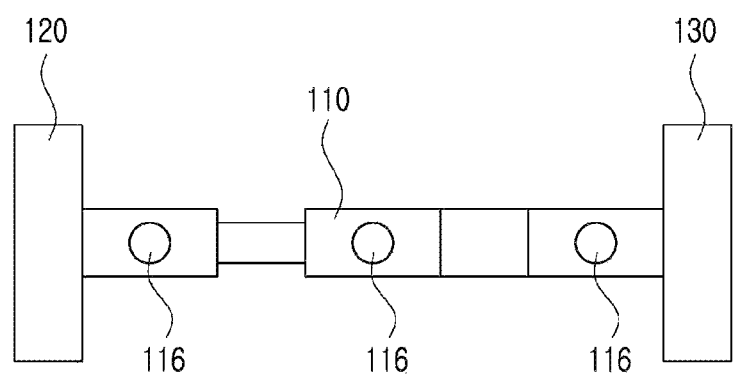
FIG. 9 is a view illustrating the link illustrated in FIG. 7 when viewed along the Y axis.

FIG. 6 is a view illustrating a cross section of a vibration reduction bearing according to another exemplary embodiment of the present disclosure, FIG. 7 is a perspective view of a link of the vibration reduction bearing illustrated in FIG. 6, FIG. 8 is a view illustrating the link illustrated in FIG. 7 when viewed along the Z axis, and FIG. 9 is a view illustrating the link illustrated in FIG. 7 when viewed along the Y axis.

The vibration reduction device for a bearing illustrated in FIG. 6 is similar to the device described in the exemplary embodiment of FIG. 3, but differs from the device described in the exemplary embodiment of FIG. 3 in that an orifice is formed.

That is, the vibration reduction device for a bearing illustrated in FIG. 6 is identical to the device described in the exemplary embodiment of FIG. 3 in that the bearing tube 50 surrounds the outer race of the bearing and is spaced apart from the outer race of the bearing at a predetermined interval, the links 100 are disposed between the outer race and the bearing tube, and each of the links 100 includes the connecting member 110 which is disposed in the circumferential direction between the outer race and the bearing tube, the outer race connecting portion 120 which is provided at one end of the connecting member and is in contact with the outer race, and the tube connecting portion 130 which is provided at the other end of the connecting member and is in contact with the bearing tube. Therefore, an additional description will be omitted. Further, although not specifically illustrated in the drawings of the present exemplary embodiment, the stoppers may of course be provided on the outer race connecting portion and the tube connecting portion, respectively, as described above.

In the present exemplary embodiment, orifices 116 are formed in the connecting member to implement a damping effect resulting from a flow of a fluid. In other words, in the case of a bearing in which a viscous fluid is accommodated between the outer race of the bearing and the bearing tube, the accommodated fluid flows due to the rotation of the bearing, and the orifices are formed in the connecting member to implement the damping effect resulting from the flow of the fluid. The orifice may have various shapes, but in the present exemplary embodiment, a state in which the orifices are formed in the direction (Y-axis direction) perpendicular to the rotation axis of the bearing is illustrated.

What is claimed is:

1. A vibration reduction device for a bearing, comprising:
  a bearing tube which is spaced apart from an outer race of a bearing at a predetermined interval and surrounds the outer race; and
  a link which is disposed between the outer race and the bearing tube,
  wherein the link includes an outer race connecting portion which is in contact with the outer race, and a tube connecting portion which is in contact with the bearing tube,
  wherein the link further includes a connecting member which is disposed in a circumferential direction between the outer race and the bearing tube and connects the outer race connecting portion and the tube connecting portion, and wherein the connecting member has an orifice formed to implement a damping effect resulting from a flow of a fluid.

2. The vibration reduction device according to claim 1, wherein the outer race connecting portion is disposed on the bearing in a radial direction, and has one end fixed to the outer race, and the other end spaced apart from the bearing tube at a predetermined interval.

3. The vibration reduction device according to claim 2, wherein a first stopper made of an elastic material is provided at the other end of the outer race connecting portion.

4. The vibration reduction device according to claim 3, wherein a second stopper made of an elastic material is provided at the other end of the tube connecting portion.

5. The vibration reduction device according to claim 2, wherein the tube connecting portion is disposed on the bearing in the radial direction, and has one end fixed to the bearing tube, and the other end spaced apart from the outer race at a predetermined interval.

6. The vibration reduction device according to claim 1, wherein the connecting member has cross section reducing portions formed by reducing cross sections so that the connecting member is elastically deformable.

7. The vibration reduction device according to claim 6, wherein the cross section reducing portions include:
   a first cross section reducing portion which is formed by reducing a width of the connecting member in a direction of a rotation axis of the bearing; and
   a second cross section reducing portion which is formed by reducing a width of the connecting member in a direction perpendicular to the rotation axis of the bearing.

8. The vibration reduction device according to claim 6, wherein the orifice is formed in a direction perpendicular to the rotation axis of the bearing.

9. A vibration reduction bearing comprising a vibration reduction device for a bearing, the vibration reduction device comprising:
   a bearing tube which is spaced apart from an outer race of a bearing at a predetermined interval and surrounds the outer race; and
   a link which is disposed between the outer race and the bearing tube,
   wherein the link includes an outer race connecting portion which is in contact with the outer race, and a tube connecting portion which is in contact with the bearing tube, and
   wherein the link further includes a connecting member which is disposed in a circumferential direction between the outer race and the bearing tube and connects the outer race connecting portion and the tube connecting portion, and
   wherein the connecting member has an orifice formed to implement a damping effect resulting from a flow of a fluid.

10. A vibration reduction bearing comprising a vibration reduction device for a bearing, the vibration reduction device comprising:
    a bearing tube which is spaced apart from an outer race of a bearing at a predetermined interval and surrounds the outer race; and
    a link which is disposed between the outer race and the bearing tube,
    wherein the link includes an outer race connecting portion which is in contact with the outer race, and a tube connecting portion which is in contact with the bearing tube, and
    wherein a viscous fluid is accommodated between the outer race and the bearing tube.

* * * * *